United States Patent [19]

Mosey et al.

[11] 4,347,770

[45] Sep. 7, 1982

[54] APPARATUS AND METHOD FOR RADIALLY CUTTING CYLINDRICAL MATERIAL

[76] Inventors: Charles G. Mosey, 319 Henley Rd. South; George N. Mosey, 1912 Morrow Rd.; Charles J. Mosey, 308 S. 21st St.; Stephen A. Mosey, Boston Township Line Rd., all of Richmond, Ind. 47374

[21] Appl. No.: 126,949

[22] Filed: Mar. 3, 1980

[51] Int. Cl.³ .............................................. B23B 5/14
[52] U.S. Cl. .......................................... 82/90; 82/71; 82/101; 82/102
[58] Field of Search ................. 82/86, 87, 90, 91, 100, 82/101, 47, 71, 102

[56] References Cited

U.S. PATENT DOCUMENTS

| | | | |
|---|---|---|---|
| 2,356,038 | 8/1944 | Edwards | 82/90 |
| 2,380,695 | 7/1945 | Howlett | 82/90 |
| 2,553,147 | 5/1951 | Roeschiese | 82/86 |
| 3,550,490 | 12/1970 | Hicks | 82/101 |

Primary Examiner—Leonidas Vlachos
Attorney, Agent, or Firm—Woodard, Weikart, Emhardt & Naughton

[57] ABSTRACT

An apparatus for radially cutting cylindrical material including three rollers mounted with a first frame which is pivotable about an axis of one of the rollers with respect to a second frame which carries a saw arbor. One of the rollers is driven in rotation by a motor, and is geared to the saw arbor to drive the saw blades in rotation. A second roller is movable with respect to the first frame and the first roller, and a third roller is mounted on a hydraulic cylinder to clamp the three rollers against the exterior surface of a cylindrical material. Axial grooves are located on the drive roller to facilitate driving of the material, and circumferential grooves are provided on one of the other rollers to prevent axial displacement of the material subsequent to clamping. A ball screw unit pivots the first frame with respect to the second frame to cause the saw blades to engage the material and make radial cuts into the material. A process for radially cutting cylindrical material is also disclosed herein.

8 Claims, 11 Drawing Figures

APPARATUS AND METHOD FOR RADIALLY CUTTING CYLINDRICAL MATERIAL

BACKGROUND OF THE INVENTION

1. Field of the Invention

The present invention relates to an apparatus and method for radially cutting cylindrical material, and more particularly to an apparatus and method which clamps the cylindrical material at its exterior for sawing of the material.

2. Description of the Prior Art

The present invention provides an apparatus and method which clamps the exterior of a cylindrical material and radially saws into the material. The invention provides a simple and rugged device which is adaptable to cutting different sizes, shapes and lengths of material. Several radial cuts may be simultaneously made with accuracy and precision, and minimal wastage of material and wear to the components of the apparatus result. In contrast, many of the devices of the prior art have been relatively complex, wasteful and difficult and time consuming to use.

In U.S. Pat. No. 3,906,821, issued to Schultz on Sept. 23, 1975, there is disclosed an apparatus for separating plastic containers. The Schultz device comprises a complex arrangement of lever arms which carry three pairs of rollers to clamp against the threaded neck portions of the plastic bottles. Knife blades are moved against the mouths of the bottles to cut through and thereby separate the bottles. A first motor drives two pairs of the rollers through a series of belt and pulley arrangements, and a second motor drives a series of cams to actuate the movement of the rollers and the knife blades.

A ring cutting machine is disclosed in U.S. Pat. No. 2,771,662, issued to Ziska on Nov. 27, 1956. Three rollers are carried on a frame which pivots at a fourth location relative a base. The rollers are positionable to clamp against the exterior of a cylindrical tube, and each of the rollers is driven through a series of belts and pulleys. A gang saw assembly is mounted to the base and is driven by a separate motor. The Ziska device operates to cut tubular material into several rings by first pivoting the roller frame down to cause the saw blades to fully cut through the stationary tubular material at one point. Once the material has been cut through, the material is slowly rotated in a full circle to provide cutting around the full circumference, thus producing several ring-shaped pieces. In U.S. Pat. No. 3,107,564, issued to Coker et al. on Oct. 22, 1963, there is also disclosed a tube cutting machine utilizing three rollers to clamp the material and a saw blade pivoted at a fourth location relative the rollers to effect cutting. Both the Ziska and Coker et al. devices exemplify the relatively complex assemblies existing in the prior art.

In U.S. Pat. No. 3,797,338, issued to Molnar on Mar. 19, 1974, there is disclosed a machine for mass production of lengths of tubing. The Molnar device includes a rotating drum having several shelfs extending radially therefrom. Upon rotation of the drum into the cutting position, a length of material rests on the shelf and is held against the shelf and drum surface by a belt extending thereover. A drive roll for a ring splitting machine is disclosed in U.S. Pat. No. 1,908,695, issued to Deutsch on May 16, 1933. The drive roll in the Deutsch device is received within tubular material to be cut and holds the material against two rollers positioned outside of the tube. In U.S. Pat. No. 3,541,905, issued to Mey on Nov. 24, 1970, there is disclosed a cutting apparatus in which tubular material is held by a pair of rollers having a belt passing around more than half the circumference of the tubular material. Other supports for cylindrical material are disclosed in U.S. Pat. Nos. 3,302,285, issued to Mann on Feb. 7, 1967; 2,753,744, issued to Therien on July 10, 1956; 2,042,794, issued to Meyer on June 2, 1936; and, 1,017,037, issued to Borden on Feb. 13, 1912.

The above prior art devices and methods provide suitable means for radially cutting into particular types of cylindrical material. However, many of these devices are relatively complex in structure and operation, and certain of these devices are not readily adaptable to operation in heavier duty applications, such as cutting metals or solid cylindrical stock. The prior art devices also are typically not well suited to making several cuts simultaneously, and are not adaptable for cutting different sizes, shapes and lengths of material. The present invention overcomes these disadvantages, and also provides a simple, rugged, inexpensive device and method which are readily operated to provide accurate and precise cuts of varying types with a minimal wastage of material and time.

SUMMARY OF THE INVENTION

In one aspect, the present invention provides an apparatus for radially cutting cylindrical material which includes three rollers mounted with a first frame and pivotable with respect to a second frame which carries one or more saw blades. The three rollers are positionable to clamp the exterior cylindrical surface of the material to be cut. Means are provided for driving the saw blades and at least one of the rollers in rotation to simultaneously rotate the material and saw blades during the cutting operation. In another aspect, circumferential and axial grooves are provided on one or more of the rollers to facilitate the clamping and rotating of the material by the rollers. A process for making radial cuts into material having a cylindrical exterior surface, and other aspects of the present invention, are also disclosed and claimed herein.

It is an object of the present invention to provide a simple, durable and relatively inexpensive apparatus and method for radially cutting cylindrical material.

It is another object of the present invention to provide an apparatus and method for making accurate and precise radial cuts into cylindrical material, and for making several simultaneous cuts.

It is a further object of the present invention to provide an apparatus and method which is readily adaptable for radially cutting cylindrical material of differing sizes, shapes and lengths.

Another object of the present invention is to provide an apparatus and method for radially cutting cylindrical material with a minimal waste of time and material.

Further objects and advantages of the present invention will become apparent from the description of the preferred embodiment which follows.

DESCRIPTION OF THE PREFERRED EMBODIMENT

Figure 1:
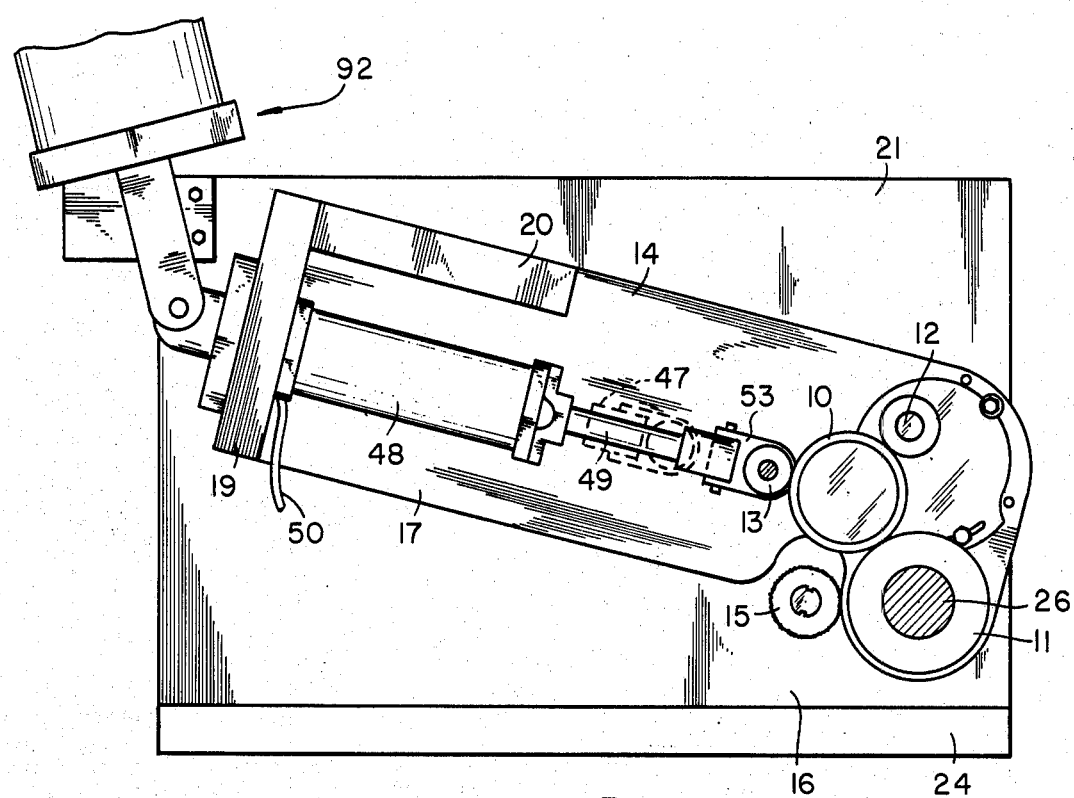
FIG. 1 is a partial side view of an apparatus constructed in accordance with the present invention.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an apparatus and method for simultaneously making several radial cuts into material having an exterior cylindrical surface. The apparatus is a relatively simple and durable device which will make several radial cuts with high accuracy and precision. The material to be cut may be easily and quickly loaded into and unloaded from the apparatus, and a variety of lengths and diameters of the material may be accommodated. The present invention operates rapidly and economically and minimizes wastage of material.

Figure 2:
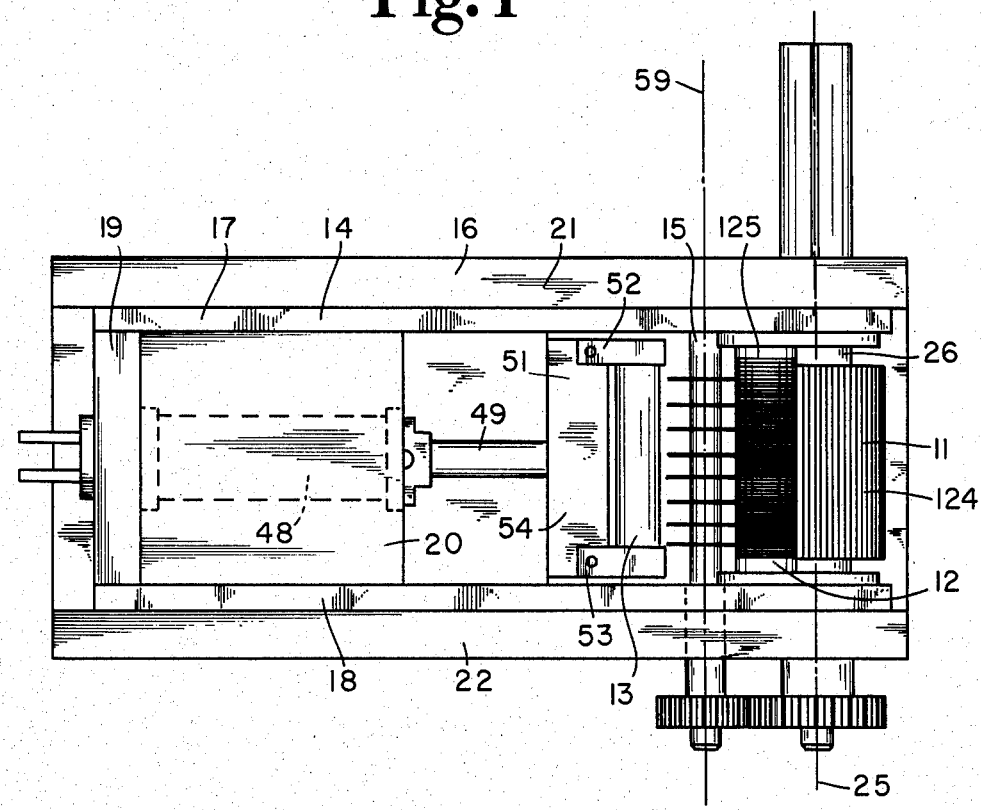
FIG. 2 is a top view of the apparatus of FIG. 1.

Some of the principles of the invention are represented in FIGS. 1 and 2. As shown in FIG. 1, the material to be cut 10 is held between rollers 11-13. The rollers are mounted to a first frame 14. A saw blade assembly 15 is mounted to a second frame 16. The first frame 14 is pivotally mounted to the second frame 16 to feed the material 10 against the saw blades of the saw blade assembly. Means are provided for positioning the three rollers to clamp against the material 10, and further means are provided for rotating one of the rollers to drive the material 10 in rotation. Drive means are provided for rotating the saw blade assembly 15, and means are also provided for pivoting the first frame relative the second frame to feed the material 10 against the saw blades of the saw blade assembly 15 to effect radial cutting of the material.

First frame 14 includes several components, including a pair of parallel plates 17 and 18 connected at one end by cross members 19 and 20. As will be further described, the other ends of the plates 17 and 18 are connected together by the mounting of the rollers 11-13 and the pivotable connection with the second frame 16.

The firm connection between plates 17 and 18 which is thereby obtained provides strength and rigidity to the first frame. These features are advantageous in properly supporting the rollers and the clamping action provided by the rollers. The strength and rigidity also provide for accurate and precise cuts by the apparatus. In a preferred embodiment, the plates 17 and 18 are spaced at a distance of 10 inches and have a thickness of 1¼ inches, with the end cross member 19 having a thickness of 2 inches and the top cross member 20 having a thickness of 2 inches. The plates are typically made of hot rolled steel or other suitable material. Other combinations of distances and thicknesses which provide adequate strength and rigidity for the first frame are useful in the apparatus.

Figure 3:
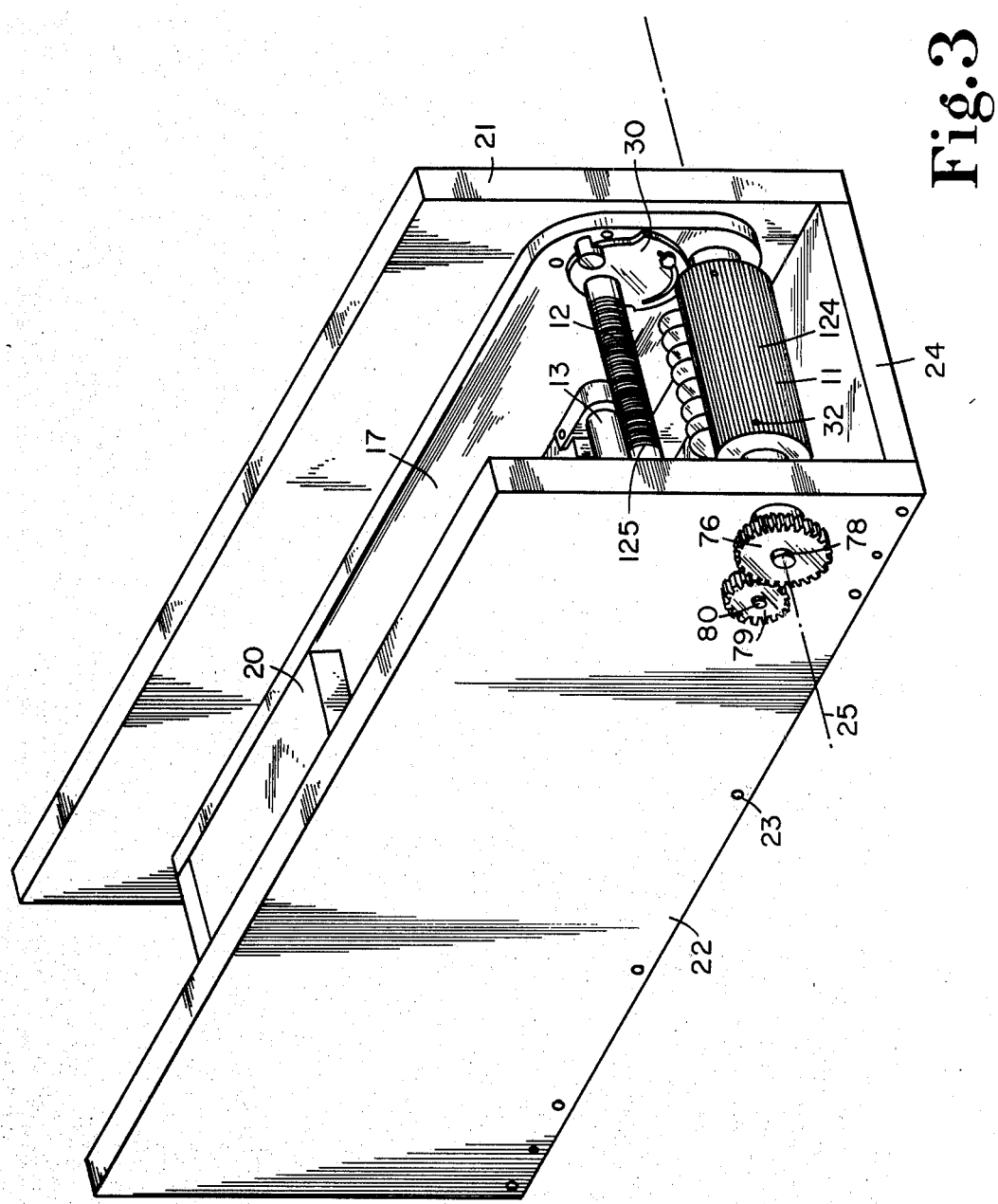
FIG. 3 is a front, perspective view of a preferred embodiment of the present invention.

The second frame 16 similarly includes several components which combine to form a strong and rigid unit. Second frame 16 includes a pair of parallel plates 21 and 22 secured with bolts 23 (FIG. 3) to a base plate 24. In a preferred embodiment, the plates 21 and 22 are spaced at a distance of 12½ inches, to rest adjacent the plates 17 and 18 of the first frame, and the plates 21 and 22 and base plate 24 have a thickness of 2 inches. Again, a typical material for such plates is hot rolled steel, and other combinations of distances and thicknesses which provide suitable strength and rigidity are useful in the apparatus of the present invention.

Pivot means are provided for pivoting the first frame 14 relative the second frame 16 about a first axis. As shown in the drawings, the first and second frames are pivotable with respect to one another about axis 25. First frame 14 pivots relative second frame 16 about a shaft 26 which is mounted by bearing means to the first and second frames. Bearing means mounting shaft 26 include bearings 27 received within the parallel plates 21 and 22 and bearings 28 received within the parallel plates 17 and 18. For these and similar bearings used in the present apparatus, it is preferable to use sealed bearings or to otherwise provide for protecting the bearings, such as by sealing the bearing races with an o-ring seal received in an annular groove adjacent the bearing races. Shaft 26 includes circumferential grooves 29 within which are received snap rings 30. The snap rings are positioned adjacent the inner faces of plates 17 and 18 and retain shaft 26 in position relative thereto. Bolts 31 are received in the exterior faces of plates 21 and 22 and retain the bearings 27 therein. Shaft 26 is thereby rotatable about axis 25 and relative the first and second frames, and the first and second frames are also pivotable with respect to one another about the shaft 26 and axis 25. As described, the second frame 16 would typically be secured to the floor or another support and the first frame would be movable with respect to this support. It will be appreciated, however, that either of the first and second frames may be stationary to a support surface, with the important aspect being the pivoting of one with respect to the other.

Figure 5:
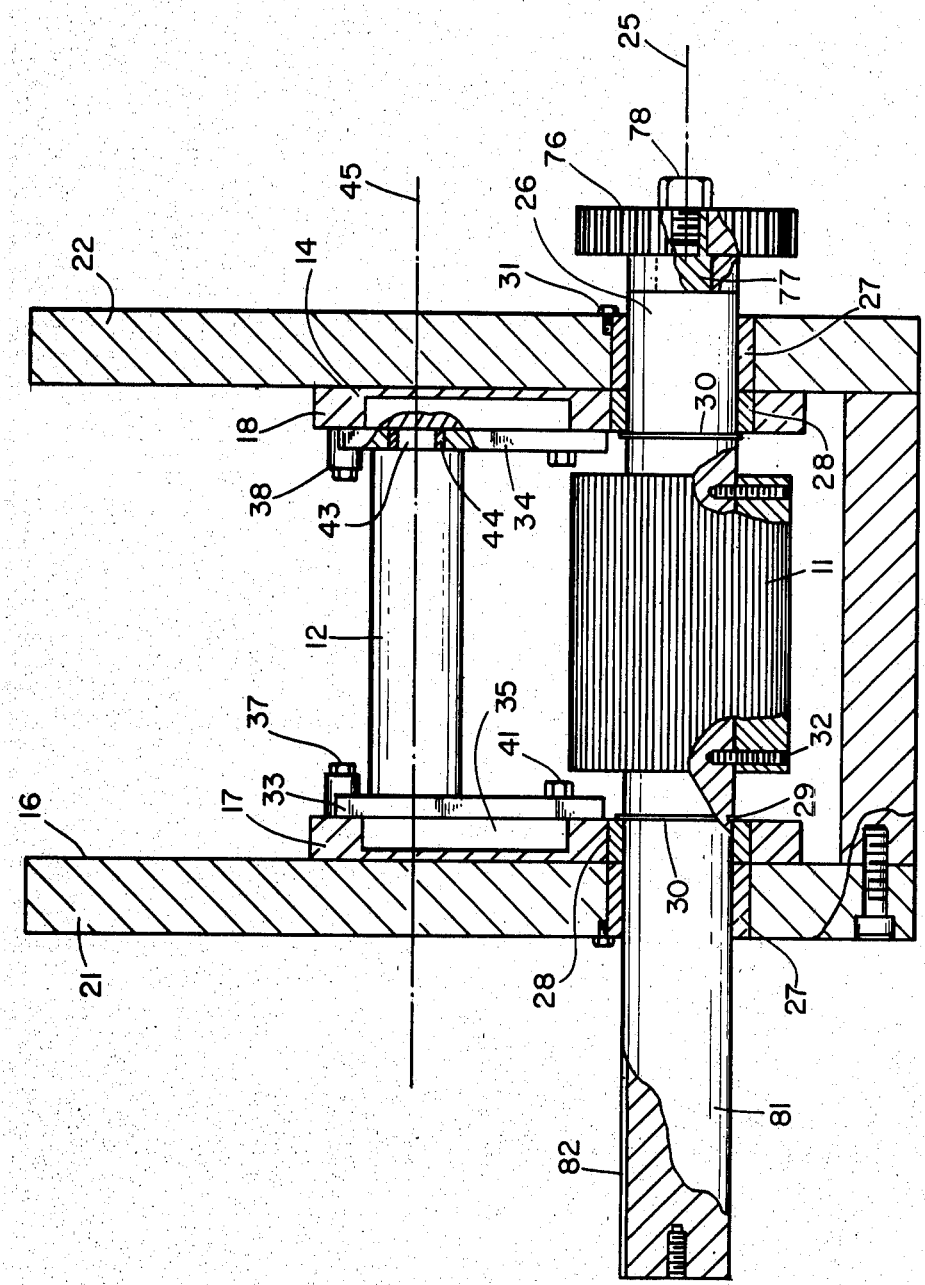
FIG. 5 is a partial, cross-sectional view of the apparatus of FIG. 4, taken along the line 5—5 in FIG. 4 in the direction of the arrows.

Roller 11 is received upon shaft 26 and secured thereto with bolts 32 (FIG. 5) which project through the roller 11 and into the shaft 26. Alternatively, a two piece roller may be used to facilitate removal of the roller. Roller 11 being attached to shaft 26 will therefore rotate along with shaft 26 about axis 25. As shown, roller 11 is mounted by bearing means to both the first frame plates 17 and 18 and the second frame plates 21 and 22. It will be appreciated, however, that pivotal movement between the first frame plates and second frame plates about axis 25 could be achieved with roller 11 mounted to only one or the other of the pairs of plates. The depicted embodiment is advantageous in that it provides a simple, and yet precise, mounting of the pairs of plates to pivot with respect to one another, and also to have the pivoting of the plates and the rotation of the roller 11 about the same axis 25.

Roller 12 is mounted to the first frame plates 17 and 18. Roller 12 may suitably be mounted to the first frame plates in a fixed position (not shown) in the same manner as roller 11. More desirably, roller 12 is mounted to be movable relative the roller 11. In a preferred embodiment, side plates 33 and 34 are rotatably mounted to the first frame plate 17 and 18, respectively. Each of the side plates includes a cylindrical portion 35 centered into a cylindrical recess in the first frame plates to provide for rotating of the side plates. A plurality of threaded holes, such as 36 (FIG. 4), are located adjacent reduced diameter portions of the side plates. Bolts 37 are received through clamping members 38 and in the holes 36 to press the clamping members against the side plates to hold them in a particular rotational position. Similarly, slots 39 are defined in larger diameter portions of the side plates, and threaded holes 40 (FIG. 4) receive bolts 41 and washers 42 which clamp against the side plates and maintain the side plates in a particular position. Alternatively, roller 12 may be positionable at differing locations directly in the first frame plates 17 and 18, or other variable mounting methods may be employed.

Bearing means are provided for mounting the roller 12 to the parallel plates 17 and 18 of the first frame 14. Roller 12 includes a body portion and reduced diameter axle portions 43 at each end of the body portion. The axle portions 43 are received within bearings 44 (FIG. 5) which are in turn mounted within corresponding apertures in the side plates. Roller 12 is thereby mounted to be rotatable about a central axis 45 which is parallel to the axis 25.

Rollers 11 and 12 are mounted at a distance from each other less than the diameter of the material to be cut. The provision of variable mounting locations for the roller 12 provides a more versatile unit readily adapted for use with a variety of sizes of material.

Third roller 13 is mounted with bearing means to the first frame member 14 to rotate about a third axis 46 (FIG. 6) parallel to axes 45 and 25. Clamp and release means are provided for positioning the third roller 13 in a first, clamped position relative the rollers 11 and 12 to clamp the rollers against the exterior surface of the material 10, as shown in full lines in FIGS. 1 and 4. The clamp and release means also are provided for positioning the roller 13 in a second, unclamped position displaced farther from the rollers 11 and 12 than in the first or clamped position, the unclamped position being shown in dotted lines in FIG. 1 at the identification numeral 47. In the clamped position, the three rollers engage the exterior surface of the material to be cut and hold it firmly in position. Further, the clamping of the three rollers against the exterior surface of the material provides for rotation of the material 10 upon driven rotation of one or more of the adjacent rollers. In the second, unclamped position the material 10 may be placed into or removed from the rollers, such as for insertion of a new piece of material to be cut or removal of the cut material.

Figure 6:
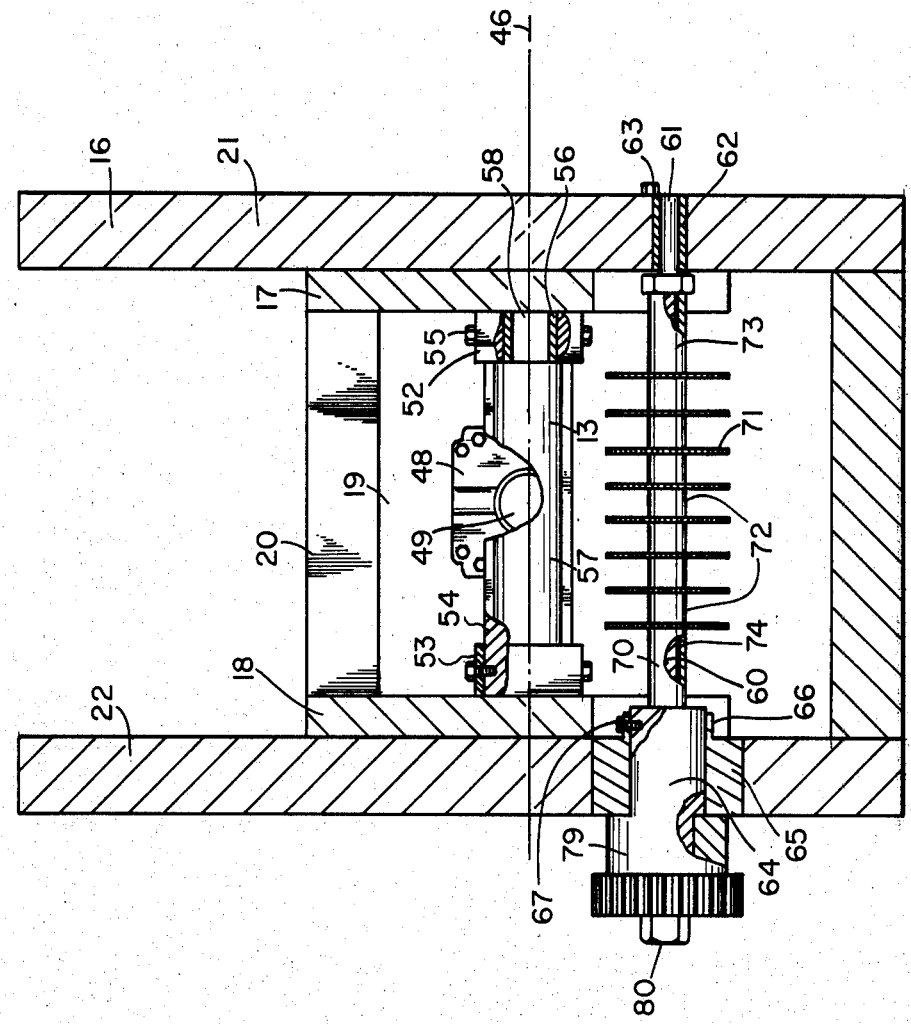
FIG. 6 is a partial, cross-sectional view of the apparatus of FIG. 4, taken along the line 6—6 in FIG. 4 in the direction of the arrows.
Figure 7:
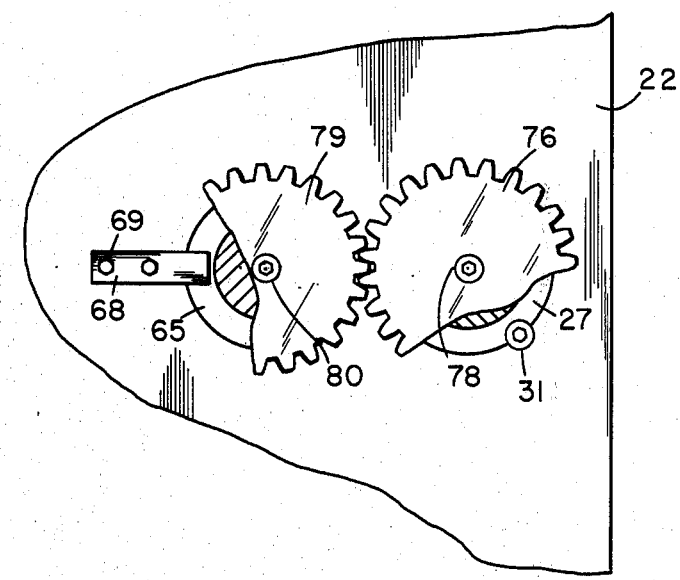
FIG. 7 is a partial, side view of the apparatus of FIG. 3 showing the details of the intermeshed gears on the saw blade arbor and drive roller.

A hydraulic cylinder 48 is mounted to the rear cross member 19 of the first frame. Piston 49 is reciprocally received within the hydraulic cylinder 48, and hydraulic lines, such as 50 (FIGS. 1 and 4) are connected to a source of hydraulic fluid, and under appropriate control will provide controlled reciprocation of the piston 49 with respect to the cylinder 48. A yoke 51 comprising a pair of arms 52 and 53 mounted to a base 54 with bolts 55 (FIG. 6) is secured to the piston 49. A pair of bearings 56 are mounted within the arms 52 and 53. Roller 13 includes a body portion 57 and axle portions 58 at either end of the body portion and received within the bearings 56 (FIG. 6). Roller 13 is thereby rotatably mounted by the bearing means, including bearings 56, to rotate about axis 46 parallel to the other roller axes 25 and 45.

Figure 4:
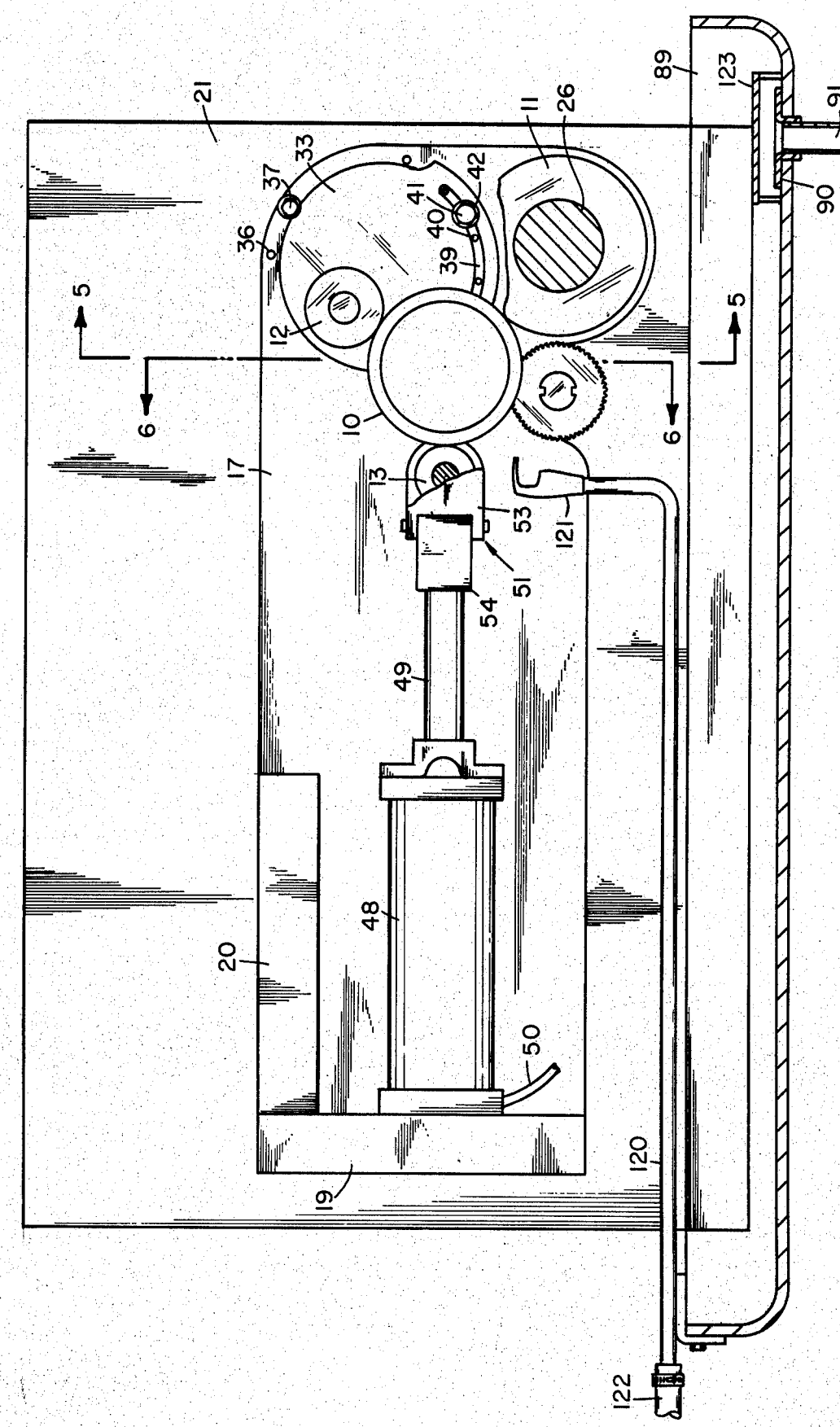
FIG. 4 is a detailed, side view of the apparatus of FIG. 3 with the left side plates removed.

Hydraulic cylinder 48 is operable to move the roller 13 to and from the clamping position as shown in FIG. 4 and the released position as shown at 47 in FIG. 1. In the clamped position, the hydraulic cylinder applies pressure through the piston 49 to clamp the roller 13 against the material 10 to force it against the other rollers 11 and 12. This maintenance of pressure causes the material to be firmly held between the three rollers during the cutting operation. An accumulator may be incorporated in the hydraulic line to help to accommodate variations in the material being cut and to otherwise aid the clamping action. By holding the material firmly between the three rollers, several desirable results are achieved. First, the material 10 is held firmly to allow for accurate, precise cutting of the material with the saw blades. For example, the surfaces produced as a result of the cutting operation can be precisely controlled in spacing, smoothness and flatness. The firm clamping action also enhances the operation of the grooving of the rollers as will be more fully described to maintain driving of the material in rotation and to maintain the position of the material from axial displacement after the cutting has been initiated.

Parallelism between at least two of the three rollers 11-13 is highly desirable, and the strength and rigidity of the first frame member 14 contributes to this parallelism. Most suitably, the axes of rotation 25 and 45 of the rollers 11 and 12, respectively, are parallel. As among the three rollers, the precise parallelism is most readily assured for the rollers 11 and 12 which are mounted more directly to the first frame member than is the third roller 13. Provisions for aligning the rollers 11 and 12 are desirable, such as by the adjustment of the relative positions of the side plates 33 and 34 to align the roller 12 to be parallel with the roller 11.

Roller 13 may suitably be maintained parallel with the rollers 11 and 12, or in certain cases may preferably be non-parallel with the rollers 11 and 12. For example, for material 10 which is slightly tapered to one end or which is non-uniform in other respects, it may be desirable to provide for one of the three rollers to adapt to this non-uniformity. In the case of a taper, for example, the maintaining of parallelism between rollers 11, 12 and 13 and the application of pressure in this configuration will tend to shift the tapered material in the direction of the larger diameter. For a very slight taper or other discrepancy in the exterior surface of the material 10, it is desirable to have one of the rollers positionable to account for this non-uniformity and to thereby maintain an even contact and pressure against the surface of the material 10.

This may be accomplished, for example, by permitting the roller 13 to move out of parallelism with the rollers 11 and 12 by a variety of known methods. For example, the yoke mounting roller 13 to the hydraulic cylinder piston may be secured with a pivotable mounting. Alternatively, a pair of hydraulic cylinders could be used to mount the roller 13, in which case the piston arms from the cylinders may extend at different lengths to provide non-parallel positioning of roller 13 with respect to rollers 11 and 12. For minor variations, "play" in the roller bearings can be adequate to permit proper alignment of the rollers to hold and rotate the material. As used herein, the term parallel is intended to include variations from true parallelism as described above.

Loading and unloading means are also provided, and the present invention greatly simplifies and facilitates these operations. For example, in the position of FIG. 1, the first frame 14 is pivoted away from the saw blade assembly 15 mounted on the second frame 16. In this position, the second roller 12 is pivoted upwardly and to the right in FIG. 1 to be more vertically aligned with the roller 11. While the material is displaced from the saws, the roller 13 may be placed in the unclamped position to permit loading of material to the unit and removal of the cut material therefrom. The pivoting of roller 12 to a more vertical alignment with roller 11 facilitates this loading and unloading operation since the roller is moved from the path of the material if loading and unloading is accomplished by a vertical feed system. It is contemplated that the spacial orientation of the first and second frames, and of the rollers and saw blade assembly mounted thereon, may be substantially varied. For example, the second frame and the saw blade assembly could pivot against the first frame fixed to a support surface. Also, the positioning could be altered to provide for front, rear, bottom or through the side loading and/or unloading of material.

Upon the loading of a new piece of material for cutting with the apparatus in the position of FIG. 1, the roller 13 is moved to the first position to clamp the rollers against the material. In the clamped position, the rollers are capable of driving the material in rotation, and this is accomplished by driving at least one of the three rollers with an external driving means. Alternatively, two or three of the rollers may be positively driven, but it is considered desirable to drive only one of the rollers and have the other two rollers operate as idlers to avoid problems which will be more fully discussed below.

With the material 10 being driven in rotation by the rollers, the first frame 14 is pivoted relative the second frame to cause the material to engage the saw blade assembly, which is also rotated by an outside driving means. As the first frame is so pivoted, to the position shown in FIG. 4, the roller 12 is moved downwardly and to the left in FIG. 4. While this position is not advantageous for simplified loading and unloading of material, it is desirable in the aspect that roller 12 is thereby positioned to be nearly diametrically opposed from the saws of the saw blade assembly to bear the radial components of the force of the saw blades against the material as the frames are pivoted with respect to one another.

Drive means are provided to rotate the rollers and to thereby rotate the material clamped between the rollers. Although all of the rollers may be individually or gang driven, this is not considered to be preferable since certain disadvantages result. One disadvantage is the fact that individual or gang driving of all of the rollers results in a more complex drive system, which is further complicated by the fact that one or two of the rollers is adjustable in its position with respect to the third roller. Another disadvantage is the fact that it is difficult to precisely coordinate the surface speeds of each of the rollers and this is further complicated by the use of different or changeable roller sizes. Differing surface speeds of the rollers are undesirable since such will cause slippage and tend to disrupt the clamping action and the evenness of the sawing operation. These disadvantages are overcome by the present invention.

In the preferred embodiment, axial grooves 124 (FIG. 2) are provided on the surface of the drive roller to produce an increased gripping action of the roller against the surface of the material 10 to be cut. It has been found that the provision of such axial grooves 124 will permit the driving of only one of the rollers to produce the desired rotation of the material to be cut. The gripping action of these axial grooves is enhanced by the amount of pressure applied by the other rollers to force the material against this drive roller.

It is preferred that the drive roller be the roller 11 located to rotate about the same axis 25 as the pivoting axis for the relative movement of the first and second frames. In this manner, the roller to be driven is fixed relative the saw blade assembly, thus permitting the driving of one from the other. Further, the roller 11 is fixed with respect to both the first and second frames, thus facilitating the driving of this roller from an external source mounted in a fixed position relative either of the first or second frames. Most suitably, the external power source is mounted in a position fixed with respect to the outside frame, which in the disclosed embodiment is the second frame 16. Again this permits the same source to drive the saw blade assembly either through a separate connection or through a geared connection between the saw blade assembly and the first roller, as will be further described.

The use of the axial grooves similarly has been found to greatly simplify the device in that provisions for separate driving of the other rollers or for ganging together of the rollers is eliminated. Also, only one of the rollers can be maintained in a fixed position relative both the first and second frames, since the frames pivot with respect to one another. The ability to drive only one of the rollers therefore further simplifies the positioning and connection of this external drive source to the driven roller.

As shown in the drawings, a further advantage is achieved by having the roller 11 operate as the drive roller and by having the movable roller 13 positioned to firmly force the material 10 against the drive roller. In this manner, the action of the axial grooves to grip the material 10 to drive it in rotation is enhanced by the pressure applied by roller 13 to press the material 10 and drive roller 11 together. It is recognized, however, that it is also desirable to locate the three rollers to be spaced about the material 10 to facilitate the clamping action, with a configuration approximating an equiradial spacing being particularly desirable in this respect. Thus, there is a balancing of the desirability for maximizing the clamping action with the desirability for providing a firm engagement between the material and the drive roller.

Saw blade assembly 15 is mounted with bearing means to the second frame 16 to be rotatable about an axis 59 parallel with axis 25. The saw blade assembly comprises a shaft 60 having a reduced end 61 received within bearing 62 (FIG. 6) mounted within plate 21 of second frame 16. Bolt 63 in plate 21 retains bearing 62 therein. Shaft 60 includes adjacent its other end an enlarged cylindrical portion 64 which is received within bearing cartridge 65 mounted within plate 22 of second frame 16. Bearing cartridge 65 includes a mounting collar 66 through which set screws 67 are received and engage cylindrical portion 64 of shaft 60 to secure the bearing cartridge thereto. A retaining bar 68 is secured with bolts 69 to the exterior surface of plate 22 to retain bearing cartridge 64 therein.

A spacer sleeve 70 is received on shaft 60 adjacent the enlarged cylindrical portion 64. Several saws 71 and spacers 72 are alternately received on the shaft and a second sleeve spacer 73 is received on the shaft. Shaft 60 defines a key way 74 and the spacers, spacer sleeves and saw blades define complementary key ways and a key is received therein in customary fashion. The saws 71 are rigidly secured to the shaft by operation of the keyway and the spacers and sleeves 70, 72 and 73, and will thereby rotate with shaft 60. Shaft 60 includes a threaded portion adjacent the end 61 and a nut 75 is received thereon to secure the saw blades and spacers against the enlarged cylindrical portion 64.

The outside diameter of bearing cartridge 65 is preferably larger than the outside diameter of the largest saw blade. In this manner, and due to other constructions as described, the saw blade assembly is easily removed from the second frame. Upon removal of retaining bar 68, the entire saw blade assembly including shaft 60, bearing cartridge 65 and saw blades 71 may be pulled through the opening in plate 22 in which bearing cartridge 65 is received. This aspect makes it extremely simple to service the saw blade assembly, such as for replacement of worn or broken saw blades or for changing of saw blade characteristics.

The saw blade assembly 15 comprises at least three, and preferably 6 or more, disc-shaped saw blades. Such saw blades 71 are securely mounted to the shaft 60 to rotate with said shaft. The assembly provides several ganged saw blades mounted in parallel spaced relation to rotate about the common axis of the shaft. While a particular construction for the saw blade assembly 15 is disclosed herein, it is to be understood that alternative assemblies of parallel, spaced, ganged saws may suitably be used with the present invention. The saw blades may be made from a variety of standard materials, and the diameters and thicknesses of the blades and the number, size and shape of the saw teeth may be selected for the particular cutting conditions and materials.

It is a feature of the present invention that the use of saw blades, as opposed to cut-off tools for example, permit the use of a thinner cutting device to minimize waste and thereby conserve material. The saw blades used in the present invention may be made at least as thin as one sixteenth of an inch, whereas cut-off tools for similar operations would typically be at least three-sixteenths of an inch wide. As an example of the savings by the present invention, a typical cutting operation is the sectioning of tubular stock into rings having a thickness of 0.809 inches. The use of a 3/16 inch cut-off tool would produce 240 pieces from a twenty foot tubular stock, whereas the present invention would yield 275 pieces, an increase of 14.5%.

To further automate the operation of the present invention, means could be provided (not shown) for removal and replacement of the saw blade assembly as desired to permit maintenance to be performed on the saw blades periodically. For example, a typical double turret unit could be employed to periodically release and remove the saw blade assembly in use at a given time and to insert a different assembly or the same assembly after servicing. Servicing of the assembly would typically include replacement of saw blades as required and the regrinding of the blades.

The desired speed of rotation of the saw blades will depend on the type and grade of material being cut, the amount of cutting desired, the feed rate of the material against the saw blades, and the nature of the saw blades themselves. In a typical embodiment the saw blades are rotated at about 125 revolutions per minute using 10 high speed saw blades having 60 teeth and a thickness of 0.062 inches to cut 1050 steel tubular material having a five inch diameter and a thickness of 0.625 inches. The time required to cut through the material under these conditions is about three minutes, although considerable variations in the cycle time and the speed of the saw blades may be used without adversely affecting the results.

The firm clamping of the material to be cut and the control of feeding the material against the saw blades as provided for with this invention contribute significantly to the flexibility of the operating parameters. The simultaneous rotation of the material and the cutting means provide similar advantages. As a result, it is possible to use relatively thin saw blades to cut material which would require a cut-off tool of considerably larger thickness. The simultaneous rotation of the material and the saw blades is significant in that the material is partially cut around its circumference before the material is cut through. If this were not the case, it would be possible that the cut would not align when the material has been turned full circle. This would not only obviously affect the precision and smoothness of the cut, but undue strain could result to the cutting device if the material is shifting axially or if a grain or other property in the material is forcing the cutting device to the side. In accordance with the present invention, the cutting around the periphery before cutting substantially into the material, or before cutting through the material in the case of tubular stock, together with the firm clamping and the provision of circumferential grooves on at least one of the rollers all combine to minimize conditions which would produce an undesirable cut and which would be detrimental to the saw blades and other components of the apparatus.

The present invention operates to generate a cut of the material, as opposed to milling the material, and distinct advantages result. In accordance with the present invention, a minimum number of teeth are present in the cut at any given time, and a maximum pressure per tooth is thereby obtained for a given total pressure of the material against the saw blades. This reduces the pressure necessary to be applied by the feed means to pivot the material against the saw blades. The present invention also permits a maximum amount of cooling and lubricating oil into the cut and permits increased heat dissipation. Chip production is reduced, thereby aiding the cutting operation. In contrast, a milling operation whereby the material is cut through while stationary and is then rotated in a circle results in low pressure per tooth requiring greater total pressure of material against saw blades, reduced cooling and lubrication, and higher chip production and resulting disadvantages.

Drive means are provided for rotating the saw blade assembly. Independent drive means may be readily employed, but it is preferred that the same drive source be used for both the drive roller and the saw blade assembly. As previously noted, certain aspects of the present invention greatly enhance the overall operation of the invention. Thus, the ability to have only one of the three rollers positively driven by an external source simplifies the roller and drive mechanisms and reduces power consumption. Similarly, the provision of only one driven roller which has the same rotational axis as the pivot axis for the first and second frame members greatly simplifies the driving of the saw blade assembly. Since the first and second frames pivot about the axis of the drive roller 11, the saw blade assembly is in a fixed position relative the drive roller regardless of the pivoted position of the frames. It is therefore very simple to drive the saw blade assembly and the drive roller with the same external source.

In a preferred embodiment, a gear 76 is secured to the reduced end 77 of first roller shaft 26 by a bolt 78. Gear 76 meshes with gear 79 mounted to the saw blade assembly shaft 60 by a bolt 80 to provide a driving connection therebetween. Either of these shafts may be driven by an external source and the meshed gears will consequently result in a driving of the other shaft. Similarly, the external drive source may be applied directly to one of the gears 76 and 79, or may be applied to both gears, in which case the intermeshing of gears 76 and 79 would not be required. Due to the fixed relative positioning of the shafts 26 and 60, the combined driving of the drive roller 11 and the saw blade assembly is readily accomplished.

Figure 8:
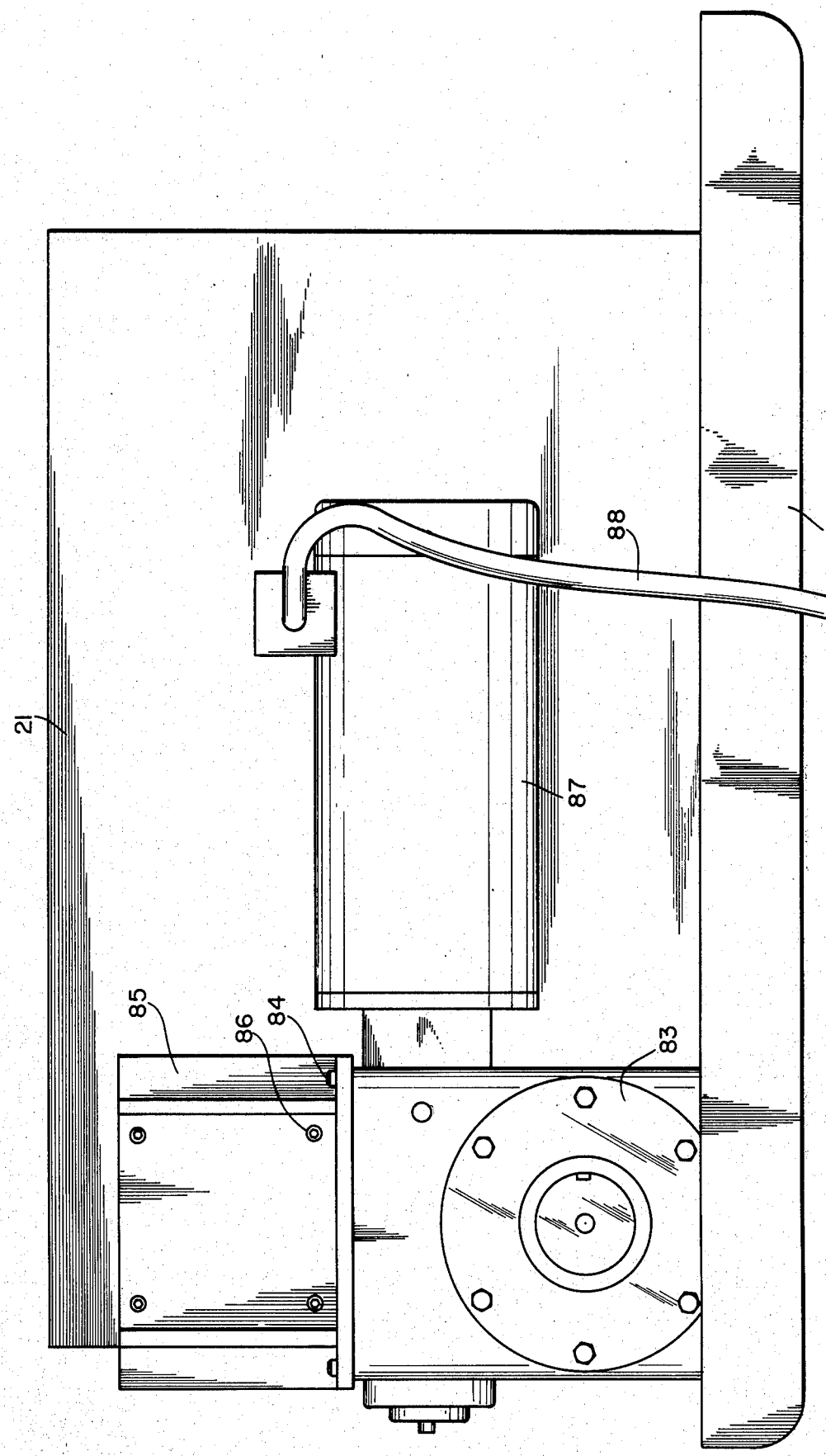
FIG. 8 is a right side view of the apparatus of FIG. 3, showing the mounting of the motor for the drive roller.

It is preferable, as shown, to drive the shafts by the direct driving of one of the shafts. In order to obtain the advantage of ready removal of the saw blade assembly, it is desirable to drive the shaft 26 of the drive roller 11. Shaft 26 extends through plates 17 and 21 and includes a drive portion 81 having a keyway 82 (FIG. 5) defined therein. Drive portion 81 is received within and keyed to a gear reducer 83 in standard fashion. Gear reducer 83 is secured with bolts 84 to a mounting bracket 85 (FIG. 8), which is in turn secured with bolts 86 to second frame plate 21. Hydraulic motor 87 is also mounted to plate 21 and is connected with gear reducer 83 to drive shaft 26. The hydraulic motor is connected through hydraulic line 88 to a suitable source of hydraulic fluid. Alternatively, an electric motor could of course be used, and direct drive or coupled drive other than through a gear reducer could be employed.

The simplicity of the present invention and its operation is reflected in the simplicity of the preferred controls. For a given operating requirement, the operation is fully automatable, with the usual exceptions for maintenance and supervision. In addition, specific functions of the apparatus may desirably be manually controlled. A control panel could include on/off switches for the hydraulic systems, sawing systems and cooling systems. In addition, a manual/automatic switch would likely be provided. Specific manual switches are desirable for clamping, unclamping, and pivoting the material to and from the saw blades. Additional controls as desired may be provided, and additional system components may call for corresponding control devices.

As in other types of cutting operations, means are provided for cooling the saw blades and material during the cutting operation and for cleaning the cutting area. The apparatus is mounted within a pan 89 which includes a drain 90 connected to a drain pipe 91. Feed pipe 120 is secured to the base plate 24 of the second frame 16 and mounted thereon is a nozzle 121. Feed pipe 120 is connected through hose 122 to a suitable source of fluid which is pumped through the feed pipe and nozzle under pressure. The fluid is directed by nozzle 121 against the surface of the material being cut at the location of the cutting. This fluid operates to lubricate and cool the saw blades and the material and also to cleanse the cutting area, particularly the interior of the cut grooves. A high sulfur base, black cutting oil is preferred. This fluid falls onto the base plate and flows over the base plate to the screen 123 mounted on the floor of the pan 89. The particles of material produced by the cutting are collected on the screen and the fluid passes therethrough to the pan and into the drain pipe.

Means are also provided for further cleaning this fluid to remove the particles produced during the cutting operation. A magnetic separator (not shown) may be used in appropriate circumstances to remove certain metal particles from the fluid. Other filtering means may be employed as is well recognized in the art for preparing such fluids for recycle. The refurbished fluid is returned to a reservoir from which it is pumped to the hose 94 and subsequent components. Alternatively to the construction shown, a suitable opening in the base plate or other provision in the construction of the apparatus may be employed to permit the fluid and particles to drop directly into a receptacle from which they are removed for filtering or the like. The latter construction facilitates removal of the particles since all of the fluid and particles are received in one place, rather than using the screen as shown. However, the screen approach is suitable particularly in operations where personnel would be present to manually clean the screen, thus permitting a more simplified construction of the remainder of the apparatus.

In the operation of the present invention, the saw blade assembly and the material to be cut, and therefore the rollers holding the material, are simultaneously rotated prior to and during the cutting operation. The saw blade assembly and the rollers could be independently driven and provision made for controlling the driving of the two to provide simultaneous rotation of the saw blades and the material during cutting. By the construction of the preferred embodiment described herein, the coupled driving of the saw blade assembly and the drive roller results in the simultaneous rotation during cutting in a simple and direct manner which also achieves the other advantages previously described.

The relative surface speeds of the saw blades and of the material to be cut, and therefore of the drive and other rollers, may be varied within desired ranges. The desired relative speeds will vary according to the material being cut, the saw blade configurations and composition, and perhaps other factors such as the required precision or other parameters for the cuts. With independent driving of the saw blade assembly and the drive roller the variations in relative speeds can be achieved by varying the separate drives. In the preferred embodiment, this variation can be readily obtained by corresponding variation in the respective sizes of gears 76 and 79.

The saw blades are rotated to have the portions of the saw blades adjacent the material being cut move in the direction of the drive roller. In general, it is considered advantageous to have the portion of the saw blades at the material being cut move toward the stationary rollers rather than at the clamping roller which is held in position by the hydraulic cylinder or other pressuring device. If the saw blades rotate in the opposite direction, corresponding to counterclockwise in FIG. 4, then the saw blades tend to resist the action of the clamping roller. Under such conditions, the force of the saw blades may be sufficient to cause slippage of the material with respect to the rollers, particularly the drive roller, and chattering may occur. This result could be avoided by providing sufficient pressure by the clamping roller. However, it is preferred that the saw blades simply be rotated in the opposite direction, clockwise in FIG. 4, thereby tending to force the material against the stationary rollers. This condition promotes clamping of the material and good contact between the material and the drive roller to assure even rotation of the material.

The material and the saw blades are simultaneously rotated such that the adjacent surfaces upon contact are moving in opposite directions. In FIG. 4, for example, it is preferred that the saw blades rotate in a clockwise direction, and that the material to be cut also rotate in the clockwise direction. Consequently, the three rollers will be rotating in the counterclockwise direction in FIG. 4. Since the saw blades and rollers rotate in opposite directions, the interconnection of the drive roller shaft and the saw blade assembly is very simple. A direct coupling of the two with meshed gears will produce the proper relative rotations of the two, thus further facilitating the using of one shaft and drive means to drive the other shaft.

The relative surface speeds of the drive roller to the saw blade assembly are preferably from about 20 to 1 to about 1 to 20, and most preferably from about 3 to 1 to about 1 to 3. For example, a relative surface speed of the drive roller to the saw blade assembly of 20 to 1 would mean that the surface of the drive roller would move at a rate 20 times greater than the rate of movement of the edges of the saw blades. Milling operations use surface feeds in the range of 40–50 surface feet per minute. In contrast, the present invention may use a wide range of surface feeds, particularly in the higher ranges typical for high speed saws. The surface feeds vary with the factors previously indicated, and preferably range from about 100 to about 1000 surface feet per minute, more preferably from about 150 to about 300. In a typical embodiment, four inch diameter saw blades and a 5.25 inch diameter drive roller were used rotating at 100 and 87 RPM's, respectively. The result is a rate for the saw blades and drive roller of 104.7 and 119.6 surface feet per minute, respectively, or a total, effective feed of 224.2 surface feet per minute. In a preferred embodiment using the same size saw blades and roller at 125 and 50 RPM's, respectively, surface feed rates of 130.9 and 68.7, for a total effective feed rate of 199.6 surface feet per minute is achieved.

The rollers of the present invention preferably have cylindrical exterior surfaces which contact the material to be cut when clamped therebetween. Similarly, the present invention is intended for use in the cutting of material having an exterior cylindrical surface. For the purposes herein, the term cylindrical is used both in the strict geometric sense, and also to include shapes which are approximately cylindrical. It will be appreciated that substantial variation from a strictly cylindrical shape for either the rollers or the material to be cut will interfere with the optimum operation of the present invention. At the same time, however, minor variations will naturally exist in the rollers, and probably moreso in the material being cut. Minor variations in the outer diameter of tube stock, for example, are common and are intended to fall within the meaning of the term cylindrical as used herein. As a further example, piston rings and the stock from which they are cut are also non-circular in cross section, but can be properly produced by the present invention. Such material is specifically intended to be included within the term cylindrical as used herein, and the operation of the present invention with such material is intended to be covered hereby.

Means may be included in the present invention to accomodate differing degrees of non-uniformities or other variations in the material to be cut. As previously discussed, one of the rollers, preferably the one which clamps the material against the other rollers, may be mounted to deviate from parallelism with the other rollers to account for certain material non-uniformities, such as a slightly tapered external surface. For other non-uniformities in the outer surface of the material, such as a non-round surface as occurs for piston ring stock, additional means may be provided to accomodate this. In the preferred embodiment, the third roller 13 is mounted to a hydraulic cylinder which is secured to the first frame member. The hydraulic cylinder applies pressure to clamp the three rollers against the material to be cut. To accomodate a non-round or otherwise non-uniform material in this embodiment, the pressure of the hydraulic cylinder is adjusted to yield to the varying external surface of the material being cut. The cylinder thereby permits the roller 13 to move to the extent necessary to accomodate the outside surface of the material, while maintaining the requisite clamping pressure to firmly hold the material within the three rollers. Other means could similarly be provided, such as the use of a spring mounting of one or more of the rollers to permit yielding of the position of the roller to accomodate variations in the surface of the material to be cut. It is another aspect of the provision by this invention for driving only one of the rollers that accomodation of such material can be easily achieved without conflicting with complex drive mechanisms.

As shown somewhat schematically in FIG. 1, a feed means 92 is provided for moving the first frame 14 relative the second frame 15 by pivoting about the axis 25. In a first position, as shown in FIG. 1, the material to be cut is displaced from the saw blades. In this first position, the material is loaded into or unloaded from the rollers 11–13. Once a length of material to be cut is loaded into the rollers and clamped therebetween, the drive roller, and therefore the material, is rotated and the saw blade assembly is also rotated by the respective drive means. The feed means then operates to provide controlled movement of the first frame relative the second frame to a second position, as shown in FIG. 4, in which the saw blades engage and cut the material.

Figure 9:
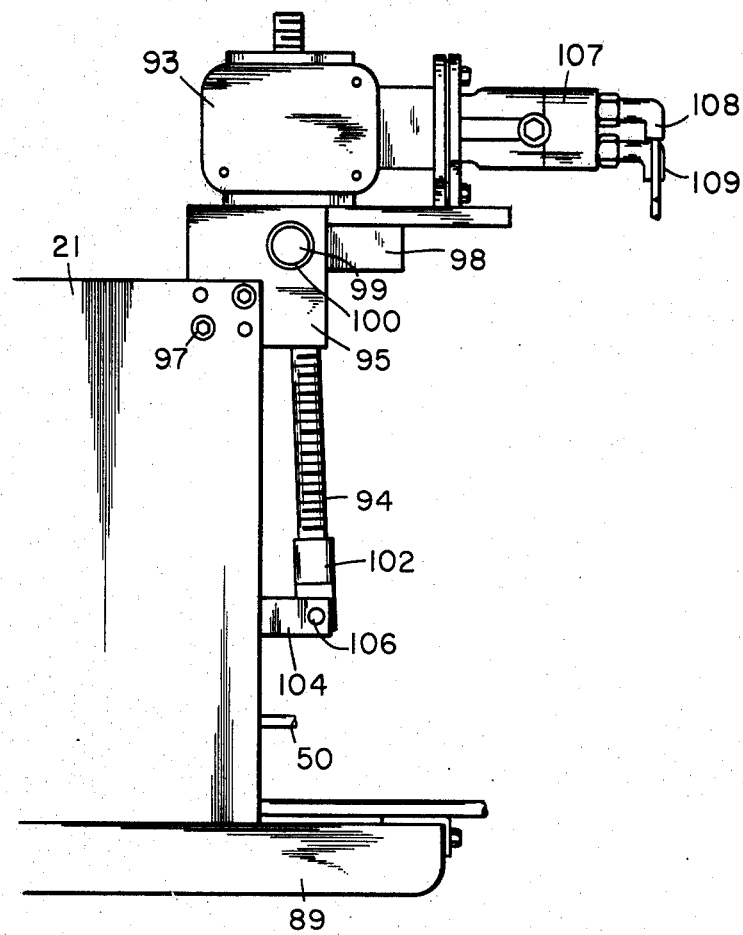
FIG. 9 is a partial side view of a feed means useful in connection with the present invention.
Figure 10:
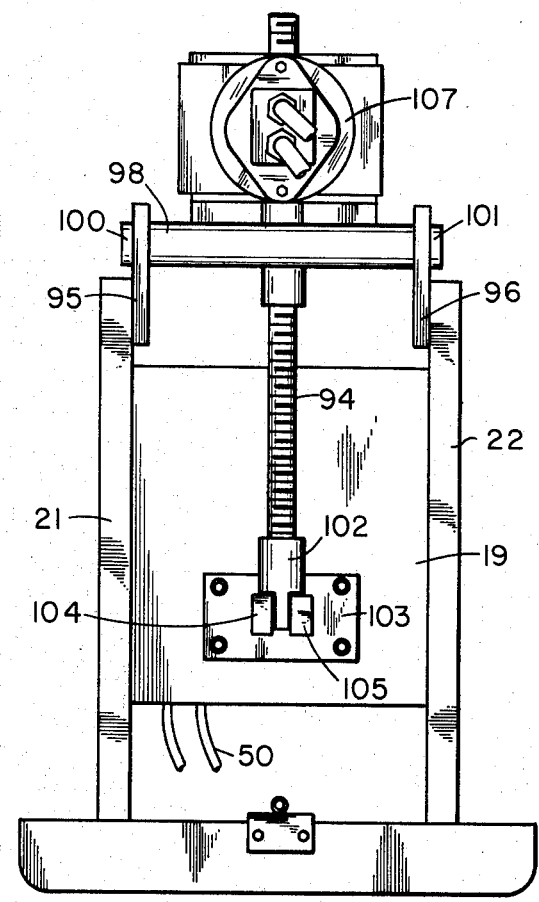
FIG. 10 is a partial rear view of the apparatus of FIG. 3, showing in particular a feed means useful in connection with the present invention.
Figure 11:
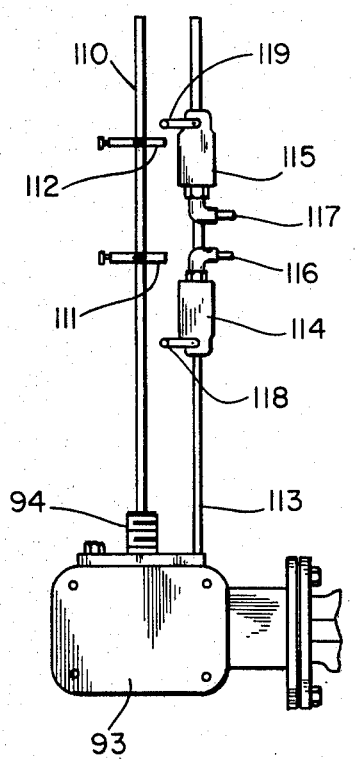
FIG. 11 is a partial, side view of a feed means useful in connection with the present invention, and particularly showing the limit means for controlling the upward and downward extents of movement produced by the feed means.

A preferred embodiment for the feed means is shown particularly in FIGS. 9–11. A ball screw unit 93 is mounted to the second frame and includes a ball screw 94 attached to the first frame. Mounting plates 95 and 96 are attached with bolts 97 to the second frame plates 21 and 22, respectively. Bracket 98 includes opposed posts 99 which are received respectively within bushings 100 and 101 secured within aligned apertures in the mounting plates 95 and 96. Bracket 98 and therefore the ball screw unit 93 which is mounted thereon are thereby pivotable about the axis of posts 99.

Ball screw 94 is secured at its lower end to a clevis 102 which is pinned thereon. A yoke 103 including arms 104 and 105 is secured with bolts to the rear surface of cross member 19. Pin 106 is secured within apertures in the arms 104 and 105 and extends through an aperture in clevis 102 to provide a pivotal connection between the ball screw 94 and the first frame.

Ball screw unit 93 includes a variable speed hydraulic motor 107 connected through hydraulic lines 108 and 109 to a suitable fluid source. The motor 107 is operable to drive a hollow shaft worm gear reducer which drives the ball screw nut in rotation to cause the ball screw to displace axially with respect to the ball screw unit. The axial displacement of the ball screw produces a corresponding relative movement between the points of connection of the ball screw to the first and second frames. As the ball screw is drawn upwardly relative the ball screw unit in FIG. 9, for example, the rear end of the first frame is moved upwardly, causing the first and second frames to pivot in the direction toward the first position of FIG. 1. Conversely, as the ball screw nut is rotated in the opposite direction to force the ball screw to displace downwardly in FIG. 9, the first frame is pivoted downwardly in the direction of the second position shown in FIG. 4.

The provision of the two pivot points at the connections of the ball screw and unit to the first and second frames accounts for the pivoting movement which results between the frames upon displacement of the ball screw. Alternative feed means for providing controlled pivoting movement of the first and second frames may be used and are contemplated by this invention. For example, a similar ball screw unit could be employed in which the ball screw is rotated and the nut is displaced along the screw. A hydraulic cylinder, such as shown in FIG. 1, or other variety of movement means may be used as the feed means as well.

It is highly desirable that the feed means employed be capable of well controlled relative movement between the first and second frames. The rate and evenness of the pivoting movement between the frames will affect the cutting operation. Assuming other parameters to be fixed, there will be preferred rates of feed and desired evenness of feed of the material against the saw blades. If the feed rate is too slow then the apparatus may be operated inefficiently, whereas a feed rate which is too fast may produce a less favorable cut and may result in damage to the material being cut, the saw blades, and other portions of the apparatus. A feed means such as a ball screw unit provides the opportunity for a very even and controllable rate of feed, and is therefore considered preferable.

Limit means are provided for controlling the movement of the ball screw 94, and therefore of the relative pivoting movement between the first and second frames. Such limit means may assume a variety of known control means. As shown in FIG. 11, a mounting rod 110 is secured to the upper end of the ball screw 94 and carries a pair of limit switch trips 111 and 112. A second rod 113 is mounted to the housing of the ball screw unit 93. Secured to the rod 113 are a pair of limit switches 114 and 115 connected through electrical lines 116 and 117, respectively, to a suitable fluid source and control unit.

Upon downward movement of the ball screw, and therefore of the first frame, arm 118 of the limit switch 114 will contact the trip 111 and signal stoppage of the downward movement of the screw, corresponding to completion of the cutting operation. The ball screw subsequently is moved upwardly relative the ball screw unit to move the first frame to the second position with the saw blades displaced from the material to be cut. Upon such upward movement, arm 119 of the limit switch 115 will engage the trip 112 and signal stoppage of the upward movement. In this manner, the pivoting of the frames of the apparatus is cycled through each cutting operation.

In the cutting cycle of the present invention, a length of material having an exterior cylindrical surface is loaded into an apparatus of the described type. The third roller 13 is maintained in the second position displaced from the rollers 11 and 12 while the material is inserted between the three rollers. The clamp and release means then operates to move the third roller 13 to the first position to clamp the three rollers against the exterior cylindrical surface of the material to be cut. Sufficient pressure is applied by the rollers to firmly engage the material, and to provide even rotation of the material upon being driven by the drive roller 11. The respective drive means initiate simultaneous rotation of the saw blade assembly and of the drive roller and the feed means pivots the first frame relative the second frame from the second position to the first position.

As the pivoting of the frames feeds the material against the saw blades, the material and saw blades are simultaneously rotating and initially the cutting forms several circumferential grooves in the material. With further pivoting of the frames toward the first position, the grooves deepen until, in the case of tubular material, the cut passes completely through the material separating it into several ring-shaped pieces. In the event that the cut passes completely through the material, the three rollers will continue to clamp each of the pieces of material in the position originally held before cutting.

The completion of the cutting operation is signaled by the limit means as the trip 111 engages arm 118 of the limit switch 114. Upon completion of cutting, the feed means operates to pivot the first frame to the first position, thus separating the saw blades from the material. The clamp and release means moves the third roller 13 to the second position displaced from the other rollers, to permit unloading of the cut material from the apparatus. The cut material, whether it be several ring-shaped pieces or one integral piece, is then unloaded from the apparatus and a new length of material is loaded for the next cutting cycle.

It is preferred that the rotation of the saw blade assembly and of the rollers be stopped upon completion of the cutting operation, and the pivoting of the first frame away from the saw blades occur with the saw blades and rollers stopped. In this condition, the third roller can be operated to release the material from the clamped condition and to move out of the way in preparation for unloading of the cut material, without interference by the saw blade assembly and drive roller rotations. In this manner, the third roller is out of the way and the material may be immediately unloaded once the first frame has pivoted sufficiently toward the second position displaced from the saw blade assembly. Other provisions may be made to speed and otherwise facilitate the loading and unloading portions of the cycle. For example, rapid advance and withdrawal of the third roller and of the first frame member may be utilized to reduce the time occupied by these movements.

Particular components of the present apparatus may be desirably modified for certain cutting operations. As discussed, variations in the saw blades in terms of size, configuration and material may be desired. Further, the diameters of the saw blades may be varied as well as the spacing of the blades. For example, combinations of different diameter saw blades could be employed to cut into a material in differing depths, or to form an annular shoulder at the location where cutting is going to proceed completely through tubular material. The spacing between adjacent saw blades may be varied, and two or more saw blades may be positioned together to provide a different cut of the material.

Similarly, the size and configuration of the three rollers may be varied to suit particular cutting operations. In one aspect, it is preferable that the drive roller include an external surface defining several axial grooves 124, preferably of a depth of about 0.003 inches, to enhance gripping of the material to drive it in rotation upon rotation of the drive roller. In another aspect, it is preferable that at least one of the rollers include several circumferential grooves 125 which operate to enhance gripping of the material to resist axial movement of the material relative the rollers. Particularly when the material has a non-uniform diameter or has a surface grain, there may be a tendency for the material to shift axially along the rollers, thus interfering with the accuracy and precision of the cuts. The circumferential grooves, which preferably have a depth of about 0.003 inches, have been found to substantially prevent this movement, producing a more precise, flatter cut of the material.

The configuration of the rollers may be varied in other respects as well. The rollers preferably have a continuous, cylindrical surface for the full extent of the location of saw blades, with the exception of the relatively narrow and shallow grooves previously described. Particular other variations may also be desirable for certain cutting operations. For example, the present invention is useful in cutting inner bearing races from machined stock. In this operation, an indexing ridge on one of the rollers may be desirable to locate with precision the material with respect to the location of the saw blades. For cutting operations performed on tubular or bar stock, this locating with respect to the saw blades is of lesser importance, although an end stop or other means may be employed to locate such material in the cutting space. The use of such a locator in these circumstances may further minimize waste of material since significant end pieces of improper size may be avoided. It is a considerable advantage of the present invention that material is conserved, particularly over prior art devices utilizing arbors which leave a substantial end piece which can not otherwise be economically salvaged. The present invention may be adapted for cutting these pieces, as well as for operating on substantial lengths of material in which case no such pieces are generated.

An aspect of the present invention is the placement of the pivot point for the two frames relatively close to the location of the saw blade assembly. This placement and the relatively distant location of the feeds means provides for a highly controllable feeding operation. First, the lever arm advantage obtained by this configuration enables more efficient use of force applied to feed the material against the saw blades. Second, the lever arm advantage tends to minimize and dampen the variations in applied force from the feed means and in resistive force of the material as it is being cut. Third, the distance which the material moves relative the saw blades is only a fraction of the corresponding distance which the ends of the frames move in pivoting. Therefore, variations in rates of movement of the feed means components, and therefore of the rear ends of the first and second frames connected with the feed means, result in only fractional variations in the rates of movement of the material against the saw blades. This enables a more even and precise control of the feeding of the material against the saw blades. For example, a variation of one inch per minute in displacement of the ends of the first and second frame members would only result in a variation of perhaps one-tenth of an inch per minute in feeding of the material against the saw blades.

The proximity of the pivot axis for the first and second frames to the saw blade assembly also contributes to the accuracy and precision of the cuts by the saw blades. The components of an apparatus necessarily have limits as to tolerance of sizes, and a certain amount of "play" in the moving components in particular will result. Also, wear of the parts will contribute to the play which results. By locating the pivoting axis for the frames proximate to the saw blade assembly, the affect of such play is minimized. This factor is comparable to the minimization of rate variation previously discussed. For example, assume that there is play in the drive roller 11 such as would permit or create a deviation at the roller of one hundredth of an inch. The resulting deviation at the rear ends of the first and second frames may be one tenth of an inch, whereas the deviation at the location of cutting by the saw blade assembly would perhaps be only two hundredths of an inch. Thus, it will be appreciated that the farther the saw blade assembly is located from the pivoting axis for the first and second frames, the more pronounced will be the effect of deviations such as result from "play" in the bearings or other components involved in the pivoting action.

What is claimed is:

1. An apparatus for making radial cuts into material having an exterior cylindrical surface comprising:
    a first frame;
    a second frame;
    pivot means for pivoting said first frame relative said second frame about a first axis;
    a first roller;
    first bearing means for mounting said first roller to at least one of said first and second frames coaxially about the first axis;
    a second roller;
    second bearing means for mounting said second roller to said first frame to rotate about a second axis parallel to the first axis, said second bearing means mounting said second roller at a distance from said first roller less than the diameter of the material to be cut;
    a third roller;
    third bearing means for mounting said third roller to said first frame to rotate about a third axis parallel to the first axis;
    clamp and release means for positioning said third roller in a first, clamped position relative said first and second rollers to clamp said first, second and third rollers against the exterior cylindrical surface of the material to be cut and for positioning said third roller in a second, unclamped position displaced farther from said first and second rollers than in the first position;
    first drive means for rotating one of said first, second and third rollers to rotate the material to be cut when said first, second and third rollers are clamped against the material to be cut;
    a saw blade assembly including a disc-shaped saw blade and further including means for mounting the saw blade in about a fourth axis through the center of the saw blade;

fourth bearing means for mounting said saw blade assembly to said second frame to rotate about the fourth axis and parallel to the first axis, said fourth bearing means mounting said saw blade assembly to have the saw blade engage the material to be cut upon pivotal movement of said first frame relative said second frame;

second drive means for rotating said saw blade assembly about the common axis; and feed means for providing controlled movement of said first frame relative said second frame about the first axis between first and second positions, the saw blade engaging the material to be cut in the first position and the saw blade being displaced from the material to be cut in the second position.

2. The apparatus of claim 1 in which said saw blade assembly includes three disc-shaped saw blades and in which said means for mounting are for mounting the saw blades in parallel spaced relation about the common axis through the centers of the saw blades.

3. The apparatus of claim 2 in which said second drive means is for rotating said saw blade assembly simultaneously with said first drive means rotating one of said rollers, said feed means further being for moving said first frame relative said second frame from the second position to the first position while said first and second drive means are simultaneously rotating said saw blade assembly and said one of said rollers to cause the saw blades to first engage the material to be cut while the saw blades and the material to be cut are simultaneously rotating.

4. The apparatus of claim 3 in which one of said first, second and third rollers includes an outer cylindrical surface having circumferential grooves.

5. The apparatus of claim 3 in which said first and second drive means are for rotating said one of said rollers and said saw blade assembly, respectively, at relative rotational velocities of from about 20 to 1 to about 1 to 20.

6. The apparatus of claim 5 in which the relative rotational velocities are from about 3 to 1 to about 1 to 3.

7. The apparatus of claim 2 and which includes positioning means for positioning said second roller at different distances from said first roller.

8. An apparatus for radially cutting material having an exterior cylindrical surface which comprises:

a frame;

a roller carrier mounted to said frame;

roller carrier mounting means for mounting said roller carrier to said frame;

first, second and third rollers rotatably mounted to said roller carrier about parallel axes;

first, second and third roller mounting means for rotatably mounting said first, second and third rollers, respectively, to said roller carrier, at least said third roller mounting means comprising a hydraulic cylinder and a piston member received within and extendable from the hydraulic cylinder, said third roller being rotatably mounted to one of the piston member and the hydraulic cylinder, the other of the hydraulic cylinder and the piston member being secured to said roller carrier, said third roller being movable to a position to hold a piece of the material against said first and second rollers to engage the material with said first, second and third rollers about greater than 180° of the exterior of the material;

drive means for rotating the material;

saw means mounted to said frame;

saw mounting means for mounting said saw means to said frame; means for rotating said saw means; and movement means for moving said roller carrier relative to said saw means, with the material simultaneously being held by said first, second and third rollers and being rotated by said drive means, to radially cut the material said roller carrier being pivotally mounted to said frame, said movement means including means for pivoting said roller carrier relative to said frame, said roller carrier being mounted to pivot relative to said frame about the axis of one of said first and second rollers.

* * * * *